United States Patent
Karulkar et al.

(10) Patent No.: US 9,166,218 B2
(45) Date of Patent: Oct. 20, 2015

(54) ELECTROLYTE REPLENISHING SYSTEM AND METHOD

(75) Inventors: Mohan Karulkar, Dearborn, MI (US); James A. Adams, Ann Arbor, MI (US); Andrew Robert Drews, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 228 days.

(21) Appl. No.: 13/404,299

(22) Filed: Feb. 24, 2012

(65) Prior Publication Data
US 2013/0224610 A1   Aug. 29, 2013

(51) Int. Cl.
*H01M 2/36* (2006.01)
*H01M 6/50* (2006.01)
*H01M 10/42* (2006.01)
*H01M 2/40* (2006.01)
*H01M 8/18* (2006.01)
*H01M 6/24* (2006.01)
*H01M 2/38* (2006.01)
*H01M 12/06* (2006.01)

(52) U.S. Cl.
CPC . *H01M 2/36* (2013.01); *H01M 2/38* (2013.01); *H01M 2/40* (2013.01); *H01M 6/24* (2013.01); *H01M 6/50* (2013.01); *H01M 8/18* (2013.01); *H01M 10/4214* (2013.01); *H01M 12/06* (2013.01)

(58) Field of Classification Search
None
See application file for complete search history.

(56) References Cited

U.S. PATENT DOCUMENTS

| | | | |
|---|---|---|---|
| 5,558,947 A | 9/1996 | Robison | |
| 6,013,192 A * | 1/2000 | Tucker et al. | 252/62.2 |
| 2004/0229107 A1 | 11/2004 | Smedley | |
| 2004/0241537 A1* | 12/2004 | Okuyama et al. | 429/86 |
| 2007/0218321 A1 | 9/2007 | O'Brien | |
| 2008/0070087 A1 | 3/2008 | Johnson | |
| 2008/0233453 A1* | 9/2008 | Shiba et al. | 429/33 |
| 2011/0104571 A1* | 5/2011 | Zhamu et al. | 429/231.95 |
| 2012/0021303 A1* | 1/2012 | Amendola et al. | 429/406 |

FOREIGN PATENT DOCUMENTS

| | | |
|---|---|---|
| DE | 4131704 A1 | 3/1993 |
| WO | 2004038829 A2 | 5/2004 |

* cited by examiner

*Primary Examiner* — Miriam Stagg
*Assistant Examiner* — Carmen Lyles-Irving
(74) *Attorney, Agent, or Firm* — Damian Porcari; Brooks Kushman P.C.

(57) ABSTRACT

A battery system includes a battery including an anode, a cathode, and a liquid electrolyte; and a conduit communicating to the battery an electrolyte liquid having an electrolyte salt density lower than an electrolyte salt density of the liquid electrolyte. The electrolyte may be non-aqueous. The electrolyte may be volatile.

18 Claims, 3 Drawing Sheets

ELECTROLYTE REPLENISHING SYSTEM AND METHOD

TECHNICAL FIELD

The present invention relates to an electrolyte replenishing system and method.

BACKGROUND

Certain batteries such as metal air batteries are met with limited use due to electrolyte solvent evaporation. In this regard, the electrolyte loses function through solvent evaporation and solvent depletion leads to loss of electrical conductivity, diminished electrochemical performance, and sometimes, battery failure.

SUMMARY

In one aspect of the present invention, a battery system is provided. In one embodiment, the battery system includes a battery including an anode, a cathode, and a first electrolyte liquid having a first electrolyte salt density; and a conduit communicating to the battery a second electrolyte liquid having an electrolyte salt density lower than the first electrolyte salt density. In certain instances, the conduit is a detachable conduit. In certain other instances, the first or the second electrolyte liquid is volatile.

In another embodiment, the conduit is in communication with the cathode.

In yet another embodiment, the battery further includes an air flow field adjacent the cathode and in communication with the conduit. In certain instances, the air flow field includes an air inlet and an electrolyte liquid inlet different from the air inlet, and the conduit is in communication with the electrolyte liquid inlet. In certain other instance, the air flow field includes an air inlet and the conduit is in communication with the air inlet.

In yet another embodiment, the battery further includes an electrolyte liquid reservoir external to the battery, the conduit is in communication with the solvent reservoir and the cathode.

In yet another embodiment, the battery further includes a solid electrode separator separating the cathode and the anode.

In another aspect of the present invention, a method of operating a battery is provided. In one embodiment, the method includes communicating to a battery a second electrolyte liquid having a second electrolyte salt density, the battery including an anode, a cathode and a first electrolyte liquid having a first electrolyte salt density higher than the second electrolyte salt density.

In certain instances, the electrolyte liquid is communicated to the cathode of the battery. In certain other instances, the battery further includes an air flow field adjacent the cathode and the electrolyte liquid is communicated to the air flow field. In yet certain other instances, the electrolyte liquid is communicated to the battery during discharging. In yet certain other instances, the electrolyte liquid is communicated to the battery during charging. In yet certain other instances, the electrolyte liquid is communicated to the battery intermittently. In yet certain other instances, the electrolyte liquid is communicated from an electrolyte liquid reservoir positioned above the battery such that the electrolyte liquid travels within the battery via capillary action. In yet certain other instances, the electrolyte liquid is communicated to the battery under an elevated pressure.

DETAILED DESCRIPTION

Figure 1:
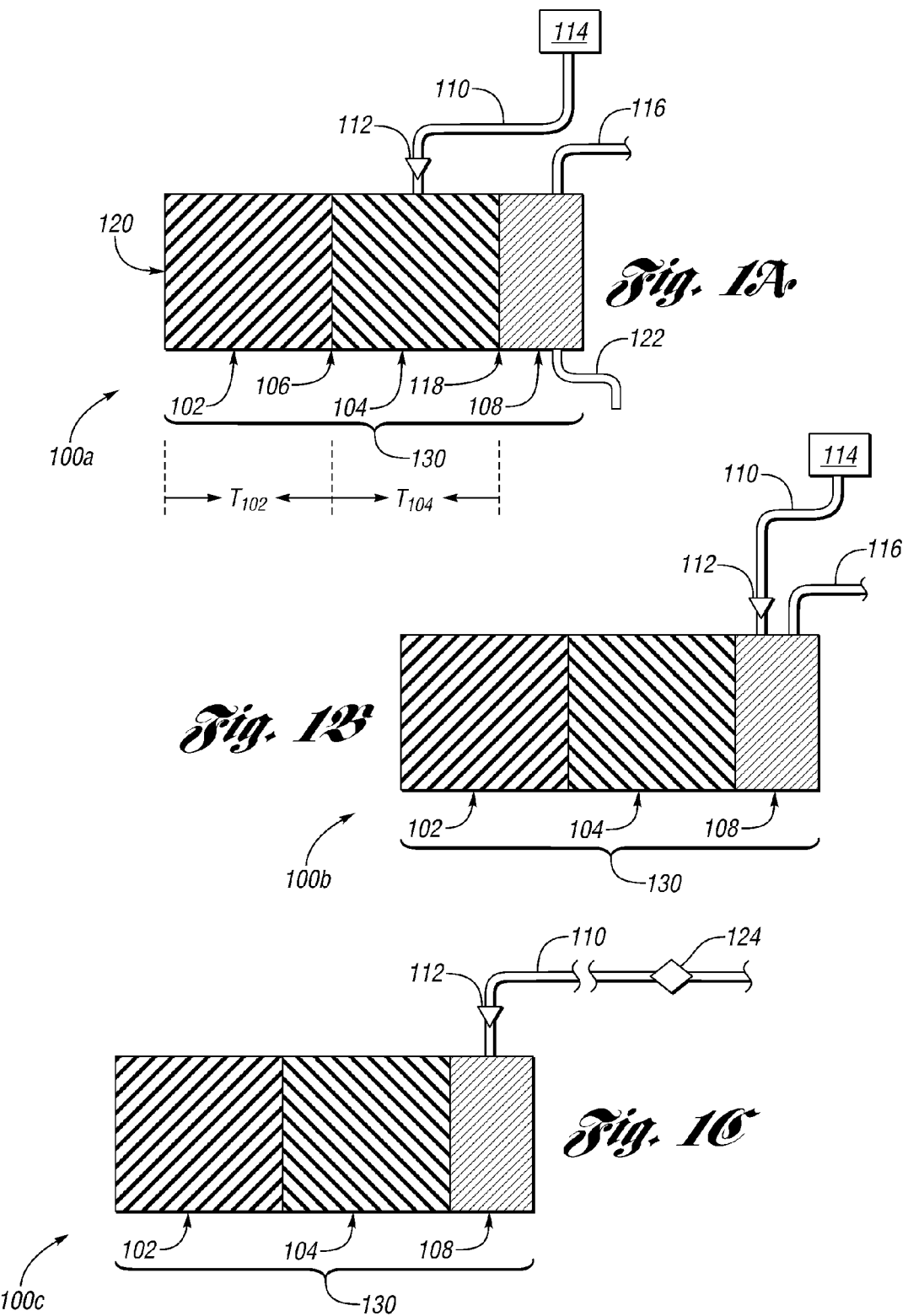
FIG. 1A depicts a battery electrolyte replenishing system according to one or more embodiments.
FIG. 1B depicts a variation of the battery electrolyte replenishing system of FIG. 1A.
FIG. 1C depicts a variation of the battery electrolyte replenishing system of FIG. 1B.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In certain batteries such as metal air batteries, air gets blown into the cathode for reactions during discharging. As the air flows in, electrolyte solvent slowly evaporates and the battery cell may dry out over time. Opening up the battery cell to get rewet with a fresh batch of electrolyte is not an option for metal air batteries, as the anode must usually be closed and sealed to prevent entry of certain battery anode toxins. One battery anode toxin is air or oxygen which, upon entry, may react with the anode metal and cause unwanted reactions. In certain instances, electrolyte loss may be caused due to side reactions and electrolyte decomposition.

In one or more embodiments of the present invention, a battery electrolyte replenishing system and method is provided. Fresh electrolyte liquid, optionally fresh electrolyte solvent, may be introduced to the battery cell. The introduction may be carried out via entry to the battery cathode, and/or the battery air flow field. Capillary action is anticipated to provide rapid and uniform wetting of the electrode at points distant from the introduction ports. Electrolyte introduction may be facilitated with applied pressure or wicking action. The electrolyte introduction may be performed during battery discharging and/or recharging, and may be performed continuously and/or intermittently.

Without wanting to be limited to any particular theory, the present invention in one or more embodiments is advantageous in that the battery does not need to be disassembled, and battery operation does not need to be interrupted. The invention can be used in stationary and mobile (automotive) applications. Electrolyte replacement of the cycled electrolyte over time can be accomplished as a maintenance procedure. Therefore, in these instances, the present invention can be both cost and time efficient.

In one or more embodiments, the term "electrolyte" refers to a material and/or structure through which charges are carried by the movement of ions. Electrolytes may be any phase on the continuum of liquid to solid, including gels, pastes, fused salts, ionic liquids, organic carbonates, or ionically conducting solids, such as sodium β-alumina, which has mobile sodium ions.

In one or more embodiments, the term "electrolyte liquid" refers to a liquid containing an electrolyte solvent as the electrolyte liquid base and optionally one or more electrolyte salts. In certain instances, and as detailed herein below, the electrolyte liquid may contain only the electrolyte solvent with no or substantially no electrolyte salts such that the electrolyte liquid in this connection can be viewed as a fresh batch of electrolyte solvent for the purpose of replenishing an existing electrolyte liquid in a battery.

In one or more embodiments, the battery electrolyte replenishing system concerns a battery that may be a metal air battery, a metal oxygen battery, a metal ion battery, or any other suitable battery with which electrolyte evaporation may be a problem. Moreover, the battery may be a primary battery or a secondary battery. A primary battery may be a battery wherein its anode is consumable during battery operation and is not kept constant. In contrast, a secondary battery, in certain type, may be a battery wherein its anode is kept relatively constant in material mass. In certain other type, such as a metal air battery, the mass of the anode may decrease during discharge. The secondary battery may be electrically rechargeable and/or mechanically rechargeable.

The mechanically chargeable type refers to a type of metal air batteries, for which, the entire battery contents are discarded after use, and new electrolyte and other materials are introduced. Mechanically rechargeable types are recharged not by being plugged into an electric outlet, but by mechanical rebuilding. In certain instances, the battery electrolyte replenishing system according to one or more embodiments of the present invention may also be applied in mechanically rechargeable batteries. Although complete electrolyte liquid flush is used in these mechanically rechargeable batteries at the end of the battery term, the battery electrolyte replenishing system described herein may be used to maintain a relatively constant electrolyte content until a complete depletion of consumable anode and/or cathode materials.

In one embodiment, and as depicted in FIG. 1A, a battery system 100a includes a battery generally shown at 130 and a conduit 110. The battery 130 includes an anode 102, a cathode 104, a first electrolyte liquid (not shown) having a first electrolyte salt density. The first electrolyte liquid is in ionic communication with both the anode 102 and the cathode 104. The conduit 110 communicates a second electrolyte liquid having a second electrolyte salt density lower than the first electrolyte salt density within the battery 130. The conduit 110 may be mechanically fixed or detachable with respect to the battery 130. The battery 130 may further include an air flow field 108. The anode 102 and the cathode 104 may be separated by an electrode separator 106. When the air flow field 108 is used, the cathode 104 may be separated from the air flow field 108 by a cathode separator 118.

The first and second electrolyte liquids may be aqueous or non-aqueous. For the anode, solid electrolyte may also be used. Volatile organic electrolytes may include Propylene Carbonate (PC), Ethylene Carbonate (EC), Dimethyl Carbonate (DMC), Dimethyl ether (DME). In certain instances where an aqueous electrolyte liquid is used in the cathode 104, a non-aqueous organic or solid electrolyte is used in the anode 102.

Referring back to FIG. 1A, the second electrolyte liquid is transported from an electrolyte liquid reservoir 114 via the conduit 110 and the flow of the second electrolyte liquid may be controlled passively via capillary action and/or actively by a volume adjustable valve 112. An air inlet 116 is located in the air flow field 108 for transporting ambient air or external oxygen into the air flow field 108. In certain instances, the air flow field 108 may be fed with oxygen or ambient air pressurized by a blower or compressor, so inflow can be controlled or shut off completely. In certain other instances, the air flow field 108 is provided with an air outlet 122 to remove oxygen depleted air from the flow field 108.

The cathode separator 118 may be formed of conductive materials such as carbon and/or a polymer material if electrical contact can be made directly with the cathode. In this connection, if the electrical contact is made with the flow field 108, the cathode 104 cannot be electrically separated. In addition, the cathode separator 118 is permeable to air and not permeable to electrolyte, to minimize electrolyte loss. In certain instances, the cathode separator 118 can be permeable to both air and electrolyte to assist with air distribution. In certain other instances, the cathode separator 118 includes polymeric material and/or coating which can facilitate the cathode separator 118 to function as a water vapor barrier to reduce water vapor in the air from entering the cathode 104.

The air flow field 108 may be carved or punched into a plate that fits over the cathode 104. The air flow field 108 defines an open space or cavity within which air flow is exchanged and therefore, the air flow field 108 can be said to have a cavity density substantially smaller than a density of the cathode 104, as the air flow field 108 is to receive air from the atmosphere and distribute the air into the cathode 104, optionally via capillary actions. The flow field 108 may include channels that wind back and forth with channel width and/or depth being less than 10 millimeters (mm), 5 mm, or 1 mm. The flow field 108 may be formed of metal materials such as aluminum and stainless steel.

Referring back to FIG. 1A, the anode 102 is situated within a sealed compartment and not intended to be open to the atmosphere. In certain instances, the anode 102 may be situated within a sealed compartment in the shape of a cube or a rectangular prism such that the anode 102 is surrounded by a housing material 120 at five sides, with the $6^{th}$ side facing the cathode 104. In the instance where the electrode separator 106 is used, the electrode separator 106 may be the $6^{th}$ side for the sealed compartment in which the anode 102 is situated. Although the volume of the anode 102 and the cathode 104 may be defined by these sides, it is appreciated that these sides do not have to be straight or flat, and in practice, can have rough or bumpy surfaces. Although the volume of the anode 102 and the cathode 104 may be defined by these sides, it is appreciated that these sides are not intended to restrict the material flow between the anode 102 or the cathode 104 with other components of the battery system 100a. For instance, and in certain particular instances, the anode 102 may be surrounded on less than all five sides to facilitate its contact with the electrode separator 106 during discharge.

The size or volume of the anode 102 may be dependent on the amount of anode metal such as lithium needed for the intended battery operation, in particular, energy and power requirements of the battery, and the amount of excess anode metal necessary to achieve cycle life requirements. In certain instances, the anode 102 has a surface area of no greater than 1 square foot, 0.5 square foot, or 0.1 square foot. In certain other instances, the anode 102 has a cross-sectional thickness of no greater than 0.5 inches, 0.1 inches, or 0.05 inches.

Referring back to FIG. 1A, the cathode 104 may be situated within a defined compartment in the shape of a cube or a rectangular prism such that the cathode 104 is surrounded by a housing material 120 at four sides, with the 5$^{th}$ side facing the anode 104 and the 6$^{th}$ side facing the air flow field 108. In the instance where the electrode separator 106 is used, the electrode separator 106 may be the 5$^{th}$ side for the cathode 104. In the instance where the cathode separator 118 is used, the cathode separator 118 may be the 6$^{th}$ side for the cathode 104. The size of the cathode 104 may be dependent on the energy and power requirements of the battery. In certain instances, the cathode 104 has a surface area of no greater than 1 square foot, 0.5 square foot, or 0.1 square foot. In certain other instances, the cathode 104 has a cross-sectional thickness of no greater than 200 microns, 100 microns or 50 microns.

In certain instances, the electrode separator 106 may be a shaped solid. Non-limiting example of the electrode separator 106 includes polyvinylidene fluoride (PVDF), or polyacrylonitrile (PAN). In certain instances, the separator is formed of a porous solid made of PVDF or PAN, for example, which allows electrolyte to contact both the anode and cathode and maintain ionic conductivity between the electrodes.

In certain instances, the battery 130 may be substantially free of water molecules and particularly liquid water molecules. In one or more embodiments, the term "substantially free" refers to an extent of being less than 1000 parts per million (ppm), less than 500 ppm, less than 200 ppm, less than 100 ppm, or less than 50 ppm. In some instances, this means that a substance, such as water, is not purposefully added and whose presence, if any, is only incidental.

Referring back to FIG. 1A, the anode 102 is depicted to have a cross-sectional thickness $T_{102}$ and the cathode 104 is depicted to have a cross-sectional thickness $T_{104}$. In certain instances, $T_{102}$ and $T_{104}$ are each independently of a value less than 1.5 millimeters (mm), 1.25 mm, 1.0 mm, or 0.75 mm. In certain instances, the anode 102, the cathode 104, the electrode separator 106 and the cathode separator 118 each independently have a cross-sectional thickness of 0.1 to 2.0 mm, 0.5 to 1.5 mm or 0.9 to 1.0 mm.

In another embodiment, and as depicted in FIG. 1B, a battery system 100b is similarly structured as the battery system 100a of FIG. 1A, with the exception of the location of the conduit 110. As depicted in FIG. 1B, the conduit 110 is detachably connected to the air flow field 108. In this regard, the conduit 110 can be separate from the air inlet 116 or can be integrated into the inlet in the sense that the conduit 110 uses the air inlet as an opening for transporting the fresh electrolyte liquid into the air flow field 108. The cathode separator 118 is permeable to the electrolyte liquid. When needed, inflow of the electrolyte liquid may be terminated and an inflow of air optionally from the air inlet 112 may force the excess electrolyte liquid out of the flow field 108. In this connection, air distribution within the air flow field 108 is not expected to be substantially disturbed after excess electrolyte liquid is forced out of the air flow field 108.

In certain instances, the second electrolyte liquid may be introduced directly into the air inlet 116 to reimburse the evaporative losses from the cathode 104. The second electrolyte liquid may be provided via the electrolyte liquid reservoir 114 and electrolyte liquid flow may also be controlled via the valve 112.

In yet another embodiment, and as depicted in FIG. 1C, a battery system 100c is similar to the battery system 100a or the battery system 100b, with the exception of a humidifier 124 positioned upstream of a leading portion of the conduit 110. The humidifier 124 provides a suitable amount of a fresh batch of electrolyte liquid to the air that is going into the air flow field 108. In this connection, the electrode liquid provided via the humidifier consists essentially of an electrolyte solvent with no or substantially no electrolyte salts.

Figure 2:
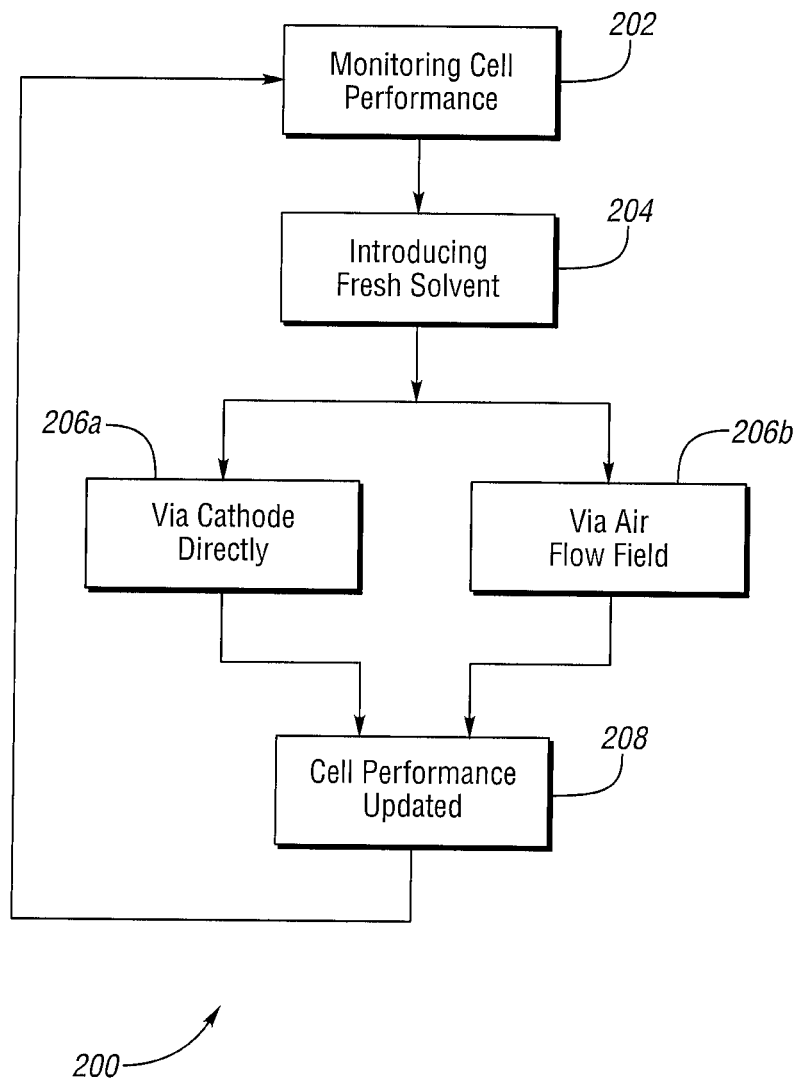
FIG. 2 depicts a battery electrolyte replenishing method according to one or more embodiments.

As depicted in FIG. 2, the battery electrolyte replenishing method is generally shown at 200. At step 202, electrolyte replenishing is determined to be desirable and/or necessary. The determination may be based on a pre-scheduled event, for instance, pre-scheduled maintenance event when the battery is idle or during recharging. The determination may also be based on certain observed reduction in electrochemical performance such that when such reduction is reached, the electrolyte replenishing is initiated. At step 204, fresh electrolyte solvent is introduced into the battery via capillary effects and/or with applied pressure. The introduction may take place at the cathode directly as depicted in step 206a, or may take place at the air flow field when applicable at step 206b. At step 208, the electrolyte introduction may be monitored such that the introduction may be terminated when the battery performance is restored. The electrolyte introduction maybe repeated as needed via following one or more of the steps 202 to 208.

Although being described herein in the context of metal air batteries, it is appreciated that the battery electrolyte replenishing system and method according to one or more embodiments of the present invention may be employed in other batteries with different configurations and/or chemistries, including those of primary or non-rechargeable battery cells and secondary or rechargeable battery cells. Non-limiting examples of a secondary battery cell include a lithium ion cell, a metal hydride cell, a metal air battery cell, and a metal oxygen battery cell. In general, a secondary battery cell is capable of storing electrical energy chemically, and the chemical storage often involves a reversible redox reaction. In the uncharged state, the redox reaction does not start spontaneously, and, in such cases, the secondary battery cell needs to be charged initially in order to store energy.

In one example of a secondary battery cell, a lithium ion cell includes a layered oxide positive electrode including lithium in ionic communication with a graphite negative electrode through a non-aqueous electrolyte and a separator. During charging, lithium is ionized from the layered oxide positive electrode and migrates through the electrolyte and separator to the negative electrode and becomes embedded in the porous negative electrode composition by the process of intercalation. During a discharge half step, the intercalation composition decomposes allowing current to flow within the battery cell by the movement of lithium ions from the negative electrode to the positive electrode.

In another example of a secondary battery cell, a metal hydride battery cell includes a metal oxyhydroxide positive electrode, such as a nickel oxyhydroxide, electrically communicating with a metal alloy negative electrode. The metal alloy negative electrode is a hydrogen storage alloy negative electrode. The hydrogen storage alloy includes a material reversibly forming a mixture of metal hydride compounds. In certain instances, the hydrogen storage alloy includes an intermetallic material having two or more solid phase metallic elements.

In yet another example of a secondary battery cell, a metal air battery cell is, in typical configurations, an open system with respect to material flow, heat transfer, and work. For instance, a metal air battery cell is provided with holes, openings, or vents, which mediate air transport between the metal air battery and atmospheric air. For most metal air batteries, moisture and interfering gases from the air often need to be filtered, eliminated, or trapped prior to the air's being introduced to the metal air battery. For instance, the metal air battery cell includes an air positive electrode electrically communicating with a metal negative electrode through an electrolyte and a separator. The air positive electrode, in typical configurations, includes a carbon composition positive electrode. During the charge reaction, oxygen is released to the ambient air.

Metal oxygen batteries (MOBs) may be characterized as a subgroup of the metal air batteries as oxygen is commonly involved for the electrochemical reactions. MOBs are known to have relatively high electrochemical capacities, and are therefore of great interest for applications where the total mass of a given battery is limited.

EXAMPLES

Example 1

A lithium air battery is subjected to successive charge/discharge cycles until battery failure, as defined by reduction in discharge capacity to 10% of starting value. Upon disassembly, the cell is found to be dry of electrolyte ($LiPF_6$ in PC:DEC). Electrolyte is manually reintroduced and the cell is reassembled. The cell then proceeded to operate normally.

Example 2

Figure 3A:
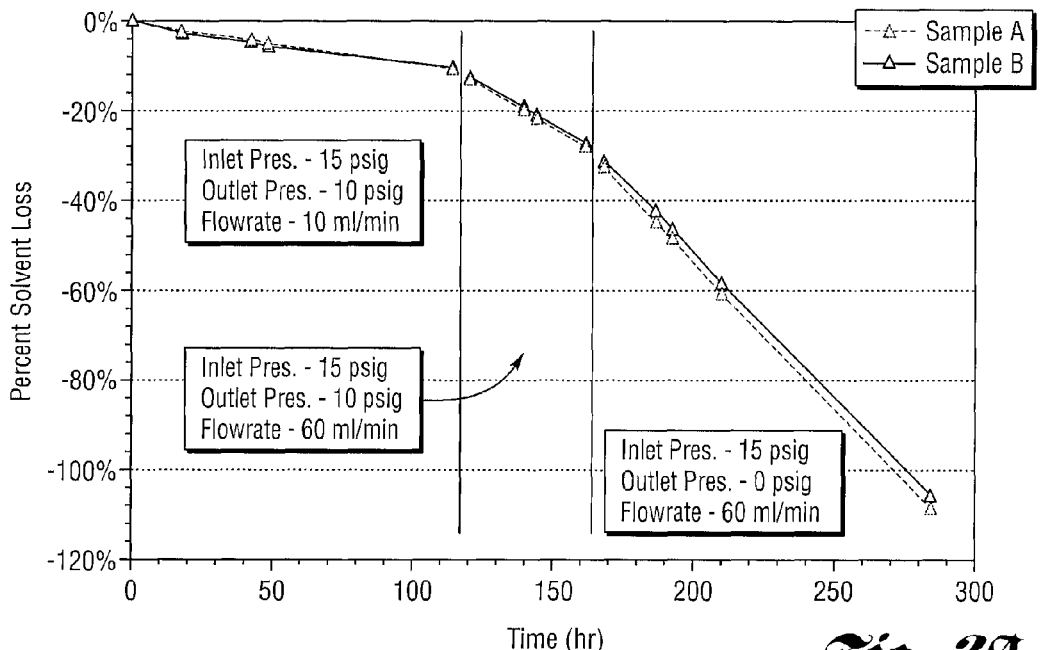
FIG. 3A depicts electrolyte solvent loss as a function of air exposure time according to one example described herein.
Figure 3B:
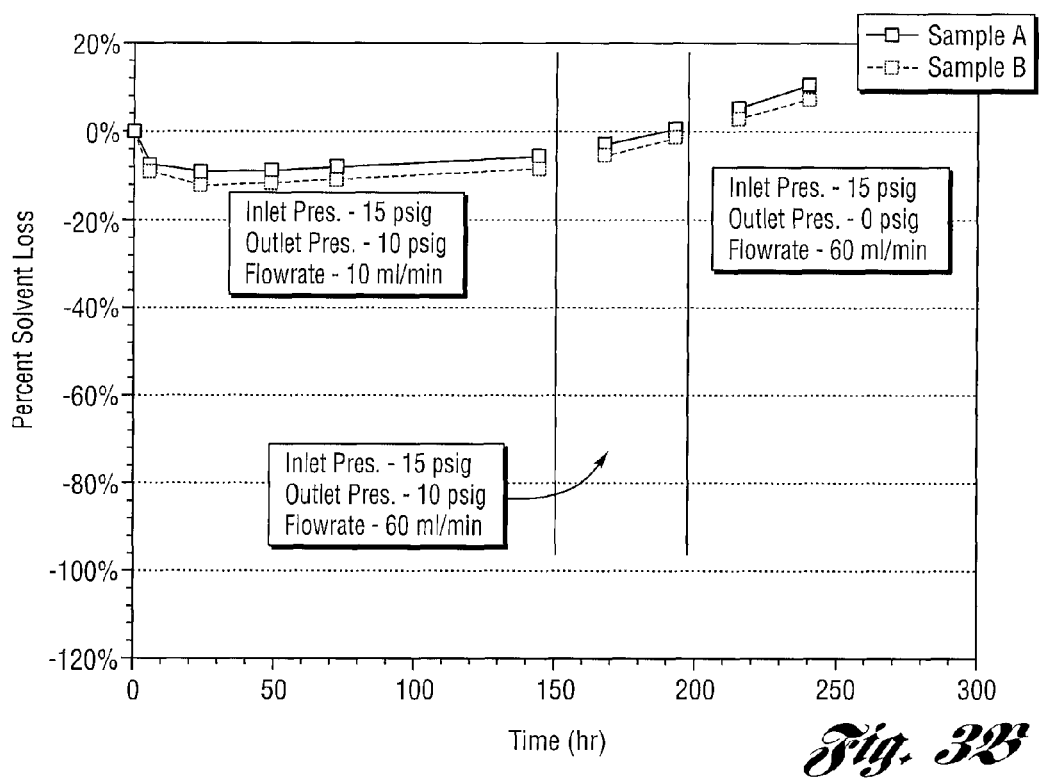
FIG. 3B depicts electrolyte solvent loss as a function of air exposure time according to another example described herein.

Sample cathodes DC13 are exposed to flowing air at varying pressures and flow rates. The sample cathodes are periodically weighted to determine electrolyte solvent loss. The electrolyte used is 1M LiTFSI in PC/EC (1:1 by weight). The initial solvent mass is estimated based on the composition of the slurry used to form the cathodes. An electrolyte solvent humidifier is placed upstream of the sample cathodes. The electrolyte solvent humidifier for this example contains no measurable electrolyte salts. FIG. 3A depicts solvent loss percentages increase as a function of time during which the sample cathodes are exposed to the air flow not coupled with a solvent humidifier. FIG. 3B depicts that solvent loss is in general greatly reduced during the testing time period wherein the sample cathodes are exposed to the air flow with a solvent humidifier. For both FIGS. 3A and 3B, results are reported in two replicate runs.

While the best mode for carrying out the invention has been described in detail, those familiar with the art to which this invention relates will recognize various alternative designs and embodiments for practicing the invention as defined by the following claims.

What is claimed is:

1. A battery system comprising:
a battery including an anode disposed within a sealed compartment, a cathode adjacent to and facing the anode, a solid electrode separator separating the cathode and the anode, and a first electrolyte liquid having a first salt density and being in ionic communication with the anode and the cathode;
an electrolyte liquid reservoir containing a second electrolyte liquid having a second salt density lower than the first salt density; and
a conduit extending between and connecting the electrolyte liquid reservoir and the battery to provide fluid communication between the electrolyte liquid reservoir and the battery, wherein the battery system is substantially free of water molecules.

2. The battery system of claim 1, wherein the conduit is a detachable conduit.

3. The battery system of claim 1, wherein the conduit extends between the reservoir and the cathode to provide fluid communication between the reservoir and the cathode.

4. The battery system of claim 1, wherein the metal air battery further includes an air flow field adjacent the cathode and in communication with the conduit.

5. The battery system of claim 4, wherein the air flow field includes an air inlet different from the conduit.

6. The battery system of claim 4, wherein the air flow field includes an air inlet and the conduit is in communication with the air inlet.

7. The battery system of claim 6, further comprising an electrolyte humidifier to humidify an air flow in the conduit prior to its entry to the air flow field.

8. The battery system of claim 1, wherein the electrolyte liquid reservoir is external to the metal air battery, the conduit extends between and connects the electrolyte liquid reservoir and the cathode.

9. The battery system of claim 1, wherein the anode includes a solid electrolyte.

10. The battery system of claim 1, further comprising a solid electrode separator separating the cathode and the anode.

11. The battery system of claim 1, wherein the first or the second electrolyte liquid is volatile.

12. A battery system comprising:
a battery including an anode, a cathode, a solid electrode separator separating the cathode and the anode, and a non-aqueous first electrolyte liquid having a first salt density and being in ionic communication with the anode and the cathode, the battery further including an air flow field being directly adjacent to the cathode so that the cathode is located between the anode and the air flow field, and a separator between the cathode and the air flow field;
an electrolye liquid container containing a second a non-aqueous electrolyte liquid having a second salt density lower than the first salt density; and
a conduit extending between the enclosed electrolyte liquid container and the battery, the conduit including a valve for controlling flow of the second electrolyte liquid;
wherein the conduit provides fluid communication between the enclosed electrolyte liquid container and the battery.

13. The battery system of claim 12, wherein the conduit is a detachable conduit.

14. The battery system of claim 12, wherein the conduit extends between the electrolyte liquid container and the cathode to provide fluid communication between the electrolyte liquid container and the cathode.

15. The battery system of claim 12, wherein the air flow field includes an air inlet different from the conduit.

16. The battery system of claim 12, wherein the electrolyte liquid container is external to the battery, the anode is contained within a sealed compartment facing the cathode, and the conduit extends between and connects the electrolyte liquid container and the cathode.

17. A battery system comprising:
   a metal air battery including an anode, a cathode, and a first a non-aqueous electrolyte liquid having a first salt density;
   an electrolyte liquid reservoir containing a second non-aqueous electrolyte liquid having a second salt density lower than the first salt density; and
   a conduit connecting the electrolyte liquid reservoir and the metal air battery and providing direct fluid communication between the electrolyte liquid reservoir and the metal air battery.

18. The battery system of claim 12, wherein the separator is permeable to air and not permeable to the first electrolyte and to the second electrolyte.

* * * * *